United States Patent
Yamazaki (10) Patent No.: US 11,050,923 B2
(45) Date of Patent: Jun. 29, 2021

(54) IMAGING APPARATUS AND CONTROL METHOD

(71) Applicant: CANON KABUSHIKI KAISHA, Tokyo (JP)

(72) Inventor: Tatsuya Yamazaki, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/741,181

(22) Filed: Jan. 13, 2020

(65) Prior Publication Data

US 2020/0236293 A1  Jul. 23, 2020

(30) Foreign Application Priority Data

Jan. 18, 2019 (JP) .............................. JP2019-007011

(51) Int. Cl.
*H04N 5/232* (2006.01)

(52) U.S. Cl.
CPC ... *H04N 5/232127* (2018.08); *H04N 5/23209* (2013.01)

(58) Field of Classification Search
CPC ......... H04N 5/232127; H04N 5/23209; H04N 5/23219; H04N 5/23218; H04N 13/383; H04N 13/366; H04N 1/00336
USPC ....................................................... 348/349
See application file for complete search history.

(56) References Cited

U.S. PATENT DOCUMENTS

| | | | | |
|---|---|---|---|---|
| 7,929,042 B2* | 4/2011 | Terashima | ......... | H04N 5/23219 348/345 |
| 8,106,995 B2* | 1/2012 | Tamaru | ................. | G03B 13/36 348/345 |
| 9,149,179 B2* | 10/2015 | Barnard | ............... | G06K 9/0061 |
| 9,188,837 B2* | 11/2015 | Ishii | ........................ | G03B 3/00 |
| 10,537,244 B1* | 1/2020 | Barash | .................. | A61B 3/113 |
| 2006/0182433 A1* | 8/2006 | Kawahara | .......... | H04N 5/23219 396/123 |
| 2007/0064145 A1* | 3/2007 | Sugimoto | .............. | G03B 13/36 348/345 |
| 2007/0201724 A1* | 8/2007 | Steinberg | ........... | G06K 9/00845 382/103 |
| 2008/0074529 A1* | 3/2008 | Terashima | ......... | G06K 9/00255 348/345 |
| 2008/0106637 A1* | 5/2008 | Nakao | .................... | H04N 5/232 348/371 |
| 2008/0166117 A1* | 7/2008 | Li | ...................... | H04N 5/23212 396/121 |
| 2009/0091633 A1* | 4/2009 | Tamaru | ............. | H04N 5/23218 348/208.14 |
| 2010/0002128 A1* | 1/2010 | Ishii | ........................ | G03B 13/36 348/349 |
| 2014/0285768 A1* | 9/2014 | Barnard | ............... | G06T 7/0014 351/206 |
| 2018/0335930 A1* | 11/2018 | Scapel | ................. | G06F 3/0484 |

FOREIGN PATENT DOCUMENTS

JP  2015-96961 A  5/2015

\* cited by examiner

*Primary Examiner* — Pritham D Prabhakher
(74) *Attorney, Agent, or Firm* — Canon U.S.A., Inc. IP Division (57) ABSTRACT

A second area corresponding to a first pupil and included in the first area, is designated. The driving of a focus lens is controlled based on an image signal corresponding to the second area. The designation is canceled in a case where a first area becomes no longer detected.

11 Claims, 6 Drawing Sheets

IMAGING APPARATUS AND CONTROL METHOD

BACKGROUND

Field of the Disclosure

The present disclosure relates to an imaging apparatus that can automatically focus on a pupil.

Description of the Related Art

In a digital camera using an image sensor, there is known a technique for detecting a face of a person from image data obtained from the image sensor, and bringing a pupil into focus in a case where the pupil is detected from an area corresponding to the face in the image data.

Japanese Patent Application Laid-Open No. 2015-96961 discusses bringing a pupil into focus in a mode where a user designates bringing either the right or left pupil into focus.

According to Japanese Patent Application Laid-Open No. 2015-96961, either the right or left pupil desired by the user can be brought into focus. However, Japanese Patent Application Laid-Open No. 2015-96961 still has an issue in terms of usability. For example, in a case where the user has designated either the right or left pupil, the designated pupil is brought into focus even if the user desires to bring the pupil different from the designated pupil into focus unless the user performs the designation again. Further, the same one of the right and left pupils is brought into focus, for example, regardless of whether the face of the same person is detected.

SUMMARY

The present disclosure is directed to a technique for focusing on a pupil exactly as intended by a user, as compared with a conventional technique.

According to an aspect of the present invention, an image capturing apparatus includes at least one processor configured to perform operation of: a first detection unit configured to detect a first area based on an image signal output from an image sensor, a second detection unit configured to detect a second area corresponding to a first pupil, the second area being included in the first area, a designation unit configured to designate the second area detected by the second detection unit, and a control unit configured to control driving of a focus lens based on an image signal corresponding to the second area, wherein the designation unit cancels designation of the second area in a case where the first area becomes no longer detected by the first detection unit.

Further features of the present invention will become apparent from the following description of exemplary embodiments with reference to the attached drawings.

DESCRIPTION OF THE EMBODIMENTS

Exemplary embodiments of the present invention will be described with reference to the attached drawings. In each of the exemplary embodiments, an imaging apparatus having a pupil detection function is used as an example. As the imaging apparatus having the pupil detection function, a video camera, a digital camera, a silver-halide still camera, and a portable device equipped with a camera function such as a smartphone may each form an aspect of the present invention.

Figure 1:
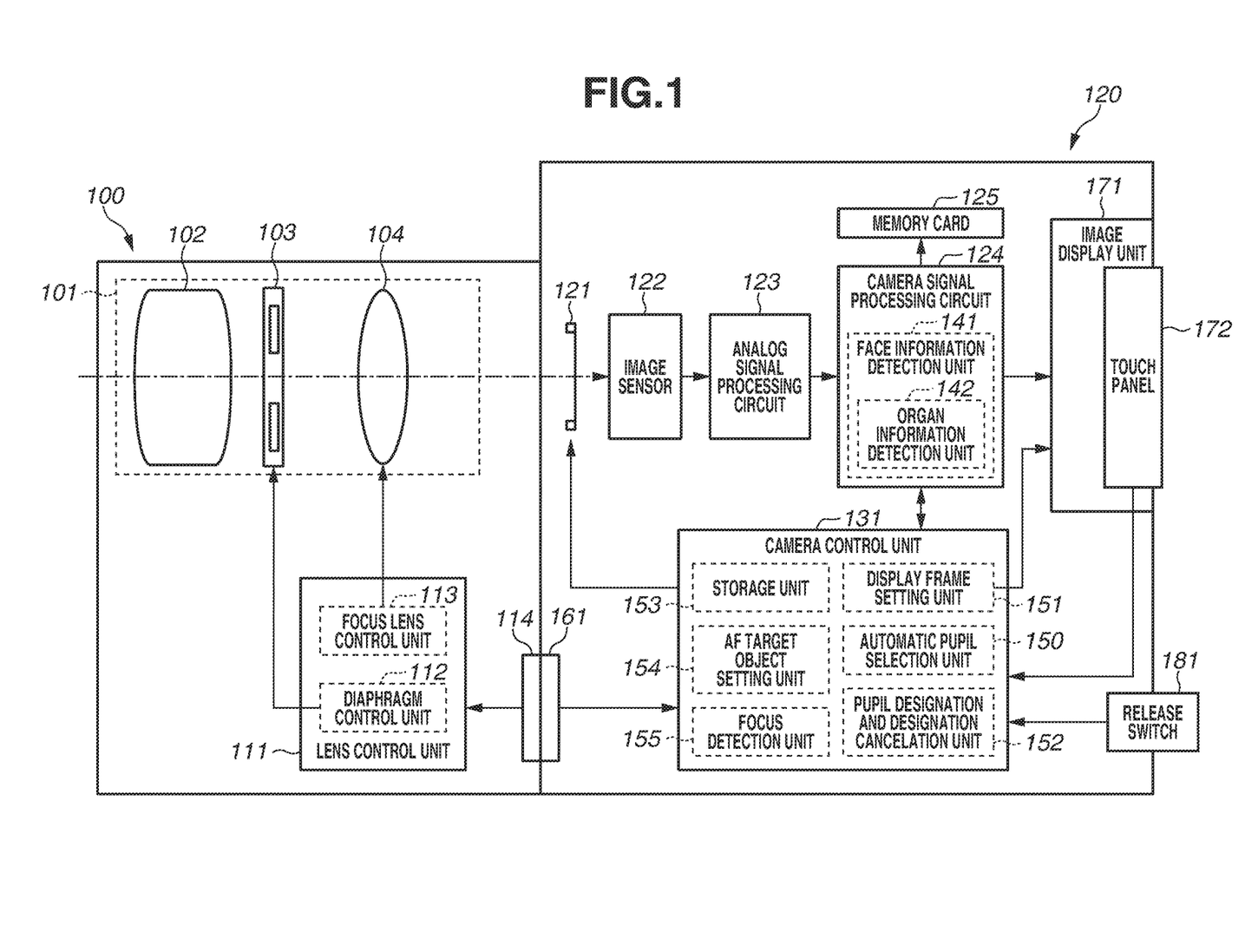
FIG. 1 is a diagram illustrating a configuration for implementing an exemplary embodiment of the present invention.

FIG. 1 is a diagram illustrating a configuration example of an imaging apparatus according to a first exemplary embodiment of the present invention. FIG. 1 illustrates a configuration of a mirrorless camera (hereinafter referred to as the camera) equipped with a pupil auto-focus (AF) function.

An interchangeable lens 100 is one of optical devices attachable to a camera main body 120. The interchangeable lens 100 includes an image capturing lens unit 101. The image capturing lens unit 101 includes a main image capturing optical system 102, a diaphragm 103 that performs light-amount adjustment, and a focus lens group 104 that performs focus adjustment.

A lens system control microcomputer (hereinafter referred to as the lens control unit) 111 includes a diaphragm control unit 112 that controls operation of the diaphragm 103, and a focus lens control unit 113 that controls operation (also referred to as driving) of the focus lens group 104. The focus lens control unit 113 drives the focus lens group 104 in an optical axis direction of the image capturing lens unit 101 based on focus-lens driving information acquired from the camera main body 120, so that the focus adjustment of the camera is performed.

The focus lens group 104 may have a plurality of focus lenses or a single focus lens. Here, a fixed focal length lens is illustrated as an example of the interchangeable lens 100 to simplify the drawing. However, the interchangeable lens 100 may be a lens that can change a focal length (i.e., zoom lens). In a case of the zoom lens, the focus lens control unit 113 acquires focal-length information from an output of an encoder that detects a zoom-lens position. Further, in a case of a lens equipped with a camera-shake correction function, the focus lens control unit 113 also controls a shift lens group for camera-shake correction.

The camera main body 120 includes a shutter 121 to be used for exposure control, and an image sensor 122 such as a complementary metal oxide semiconductor (CMOS) sensor. An imaging signal output by the image sensor 122 is processed by an analog signal processing circuit 123, and then is transmitted to a camera signal processing circuit 124.

A camera system control microcomputer (hereinafter referred to as the camera control unit) 131 controls the entire imaging apparatus. For example, the camera control unit 131 drives the shutter 121 by controlling driving of a motor for shutter driving (not illustrated). A memory card 125 is a recording medium that records data of a captured image. A release switch 181 is a member to be operated by a user. A pressed-state of the release switch 181 is transmitted to the camera control unit 131. Based on the state, the captured image is stored in the memory card 125.

An image display unit 171 includes a display device such as a liquid crystal display (LCD) panel for the user to monitor an image to be captured with the camera and to display the captured image. A touch panel 172 is an operation unit that enables the user to designate coordinates on the image display unit 171 using a finger or a stylus. The touch panel 172 can be integral with the image display unit 171. For example, the touch panel 172 may be of a built-in type (in-cell type) that is built in a display screen of the image display unit 171. In this case, the touch panel 172 is configured to have light transmittance that does not interfere with display of the image display unit 171. Further, display coordinates on the touch panel 172 and input coordinates on the image display unit 171 are in correspondence with each other. As a result, a graphical user interface (GUI) can be configured that enables the user to feel as if the user is directly operating a screen on the image display unit 171. The camera control unit 131 manages the state of an operation performed on the touch panel 172.

The camera main body 120 includes a mount contact portion 161 on a mount surface with the interchangeable lens 100. The mount contact portion 161 is a communication terminal for communicating with the interchangeable lens 100. The interchangeable lens 100 includes a mount contact portion 114 on a mount surface with the camera main body 120. The mount contact portion 114 is a communication terminal for communicating with the camera main body 120.

The lens control unit 111 and the camera control unit 131 control communication so that serial communication is performed at predetermined timing via the mount contact portions 114 and 161. Through this communication, information such as the focus-lens driving information and diaphragm driving information is transmitted from the camera control unit 131 to the lens control unit 111, and optical information such as a focal length is transmitted from the lens control unit 111 to the camera control unit 131.

The camera signal processing circuit 124 includes a face information detection unit 141, and further includes an organ information detection unit 142. The organ information detection unit 142 detects organ information about organs such as a pupil and a mouth from face information detected by the face information detection unit 141. A detection result obtained by each of the face information detection unit 141 and the organ information detection unit 142 is transmitted to the camera control unit 131.

The camera control unit 131 has an automatic pupil selection unit 150 and a display frame setting unit 151 as blocks related to the present invention. The automatic pupil selection unit 150 automatically selects a target pupil from detected face information. The display frame setting unit 151 sets a detection frame to be displayed by the image display unit 171 in correspondence with the detected face or pupil information. The camera control unit 131 further includes a pupil designation and designation cancelation unit 152 that designates a user-designated pupil as a pupil to be continuously detected, or cancels the designation based on an operation by the user. The camera control unit 131 further includes a storage unit 153 and an AF target object setting unit 154. The storage unit 153 stores a pupil or face designated based on operation by the user. The AF target object setting unit 154 notifies the selected or designated pupil or face to a focus detection unit 155 as an object to be brought into focus (also referred to as the target object). These units operate based on outputs from the face information detection unit 141 and the organ information detection unit 142. The focus detection unit 155 performs focus detection processing based on an image signal corresponding to the object notified by the AF target object setting unit 154 as the object to be brought into focus. The focus detection unit 155 performs the focus detection processing by, for example, a known phase-difference detection method or a contrast detection method. In the case of the phase-difference detection method, the focus detection unit 155 performs processing for calculating an image displacement amount determined by a correlation computation for a pair of image signals having parallax or processing for calculating a defocus amount by further converting the image displacement amount into the defocus amount, as the focus detection processing. The defocus amount can be further converted into a focus-lens driving amount in consideration of, for example, sensitivity at the time of driving the interchangeable lens 100. The camera control unit 131 transmits, to the lens control unit 111, the focus detection result (the image displacement amount or the defocus amount) obtained by the focus detection unit 155 or the focus-lens driving amount calculated based on the focus detection result. The focus lens control unit 113 controls driving of the focus lens based on the focus-lens driving information received from the camera control unit 131. In other words, the camera control unit 131 controls driving of the focus lens via the focus lens control unit 113.

<Pupil Designation Processing>

Figure 2:
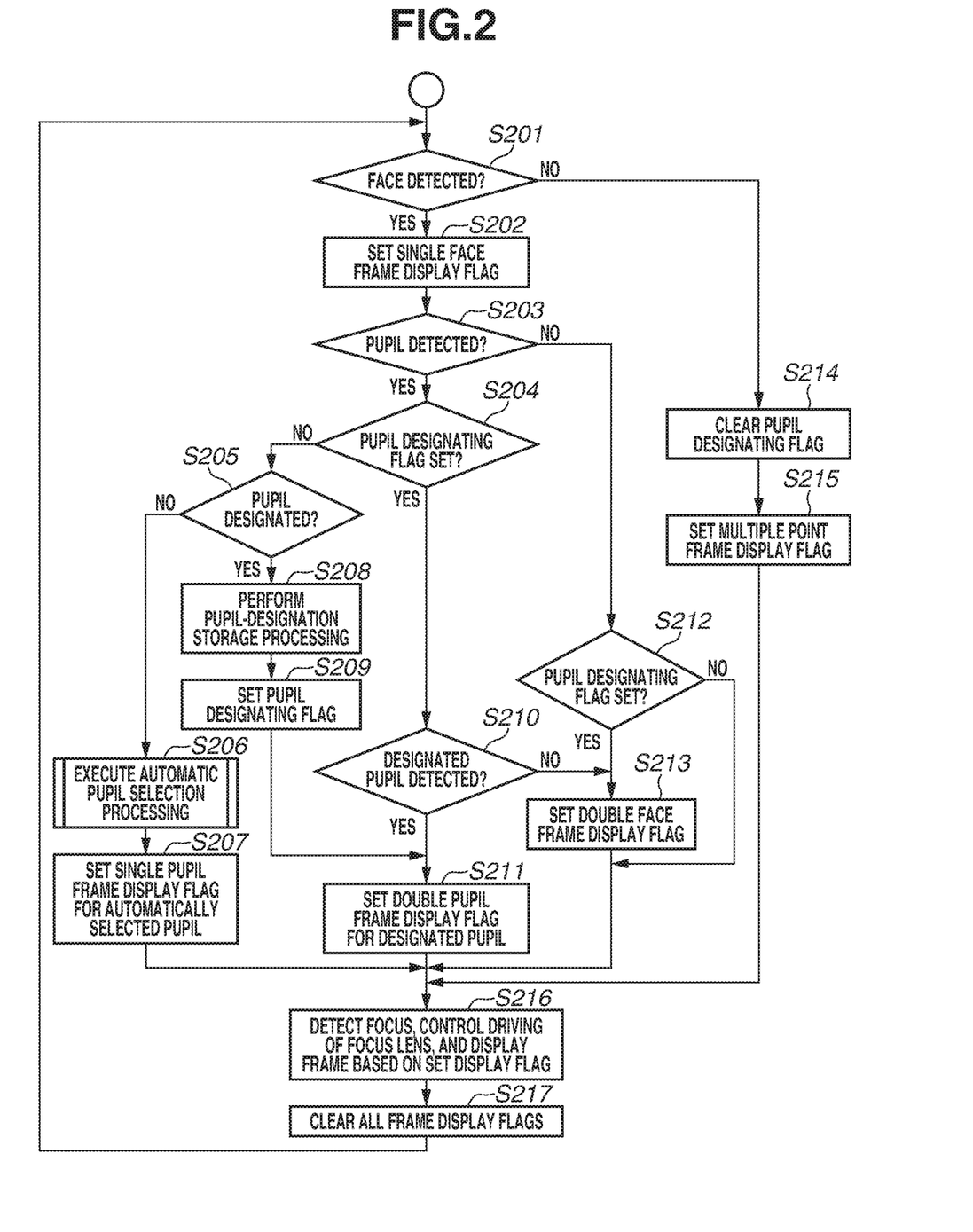
FIG. 2 is a flowchart illustrating operation according to a first exemplary embodiment of the present invention.

FIG. 2 is a flowchart illustrating operation related to the first exemplary embodiment of the present invention, in the camera control unit 131. Processing in FIG. 2 is described as processing to be performed each time an image frame is generated; however, the processing can be modified as appropriate.

The operation of the first exemplary embodiment of the present invention will be described in detail below with reference to FIGS. 1 and 2.

First, the face information detection unit 141 performs processing (not illustrated) for detecting an area corresponding to a face (corresponding to a first area) from an image signal obtained by imaging. Further, the organ information detection unit 142 performs processing for detecting an area included in the area corresponding to the face detected by the face information detection unit 141 and corresponding to a pupil, from this image signal.

In step S201, the camera control unit 131 determines whether a face is detected by the face information detection unit 141 in the image obtained by imaging. If the face is detected (YES in step S201), the operation proceeds to step S202. In step S202, the camera control unit 131 sets a single face frame display flag.

Next, in step S203, the camera control unit 131 determines whether a pupil is detected by the organ information detection unit 142.

If the pupil is detected (YES in step S203), the operation proceeds to step S204. In step S204, the camera control unit 131 determines whether a pupil designating flag is set.

If the pupil designating flag is not set (NO in step S204), the operation proceeds to step S205. In step S205, the camera control unit 131 determines whether either the right or left pupil is designated through on an operation performed on the touch panel 172. More specifically, the camera control unit 131 determines whether the pupil designation and designation cancelation unit 152 is in a state of designating either the right or left pupil based on an operation by the user. The user can designate either the right or left pupil by touching the pupil that the user desires to bring into focus on the touch panel 172. In a case where a touch operation for pupil designation is performed, the camera control unit 131 determines that the pupil is selected.

If the pupil is not yet designated (NO in step S205), the operation proceeds to step S206. In step S206, the camera control unit 131 executes automatic pupil selection processing. The automatic pupil selection processing will be described in detail below with reference to FIG. 3.

If either the right or left pupil is automatically selected in step S206, the operation proceeds to step S207. In step S207, the camera control unit 131 sets a single pupil frame display flag at a position of the automatically selected pupil, and the operation proceeds to step S216.

On the other hand, if the pupil is designated (YES in step S205), the operation proceeds to step S208. In step S208, the camera control unit 131 performs pupil-designation storage processing. In this step, the camera control unit 131 performs processing for storing information indicating whether the designated pupil is of the left eye or the right eye in the storage unit 153. In addition, the camera control unit 131 resets parameters related to automatic selection. The parameters related to the automatic selection in the present exemplary embodiment include a counter for changing between the right and left pupils as an automatically selected pupil, and an automatically selecting pupil flag. These parameters are targets for resetting.

Then, in step S209, the camera control unit 131 sets the pupil designating flag, and the operation proceeds to step S211.

Here, the processing will be described referring back to step S204. The state where the pupil designating flag is set in step S204 indicates a state where either the right or left pupil designated by the user is stored in the storage unit 153. If the pupil designating flag is set (YES in step S204), i.e., if either the right or left pupil is designated by the user, the operation proceeds to step S210. In step S210, the camera control unit 131 determines whether the pupil detected in step S203 matches the pupil designated on the touch panel 172 (corresponding to a first pupil) and stored in step S208 (i.e., whether the designated pupil is detected). If the designated pupil is detected (second area corresponding to the first pupil is detected) (YES in step S210), the operation proceeds to step S211.

In step S211, since the designated pupil is present in an angle of view, the camera control unit 131 sets a double pupil frame display flag indicating that the pupil is designated at a position of the designated pupil. Then, the processing proceeds to step S216.

On the other hand, if the pupil is not detected by the organ information detection unit 142 (NO in step S203), the operation proceeds to step S212. In step S212, the camera control unit 131 determines whether the pupil designating flag is set. If the pupil designating flag is set (YES in step S212), the current state is a state where a pupil is not detected but the face is still detected, and it is highly possibility that the designated pupil is detected again. Thus, in step S213, the camera control unit 131 sets a double face frame display flag to indicate that the pupil designation continues, and then the operation proceeds to step S216.

If the pupil designating flag is not set (NO in step S212), the current state is a state where the pupil is not designated and is not detected. Then, the processing directly proceeds to step S216.

If the camera control unit 131 determines that the pupil determined to be detected in step S210 is a pupil (corresponding to a second pupil) different from the designated pupil (i.e., a third area corresponding to the second pupil is detected) (NO in step S210), the operation proceeds to step S213. In step S213, the camera control unit 131 sets the double face frame display flag, and then the operation proceeds to step S216.

Setting the double face frame display flag in step S213 is a characterizing feature of the first exemplary embodiment of the present invention. This is a state where the pupil designating flag is not cleared, i.e., the designated one of the right and left pupils remains stored, as long as a face is found even if the designated pupil is not found. In addition, the fact that the pupil designation is not canceled is clearly displayed for the user, by displaying a face in a double display frame.

If the face is not detected (NO in step S201), the operation proceeds to step S214. In step S214, the camera control unit 131 clears the pupil designating flag, thereby canceling the pupil designation. Then, in step S215, the camera control unit 131 sets a flag for displaying multiple point display frames that indicates a state where neither a face nor a pupil is detected instead of displaying a face display frame or a pupil display frame. Then, the operation proceeds to step S216.

In step S216, the focus detection unit 155 performs focus detection. Based on a result of the focus detection, the lens control unit 111 controls driving of the focus lens. Here, if the camera control unit 131 has determined that the face is not detected in step S201, the focus detection is performed based on, for example, an image signal corresponding to each of the multiple point frames. In this process, for example, a frame is selected by a known method such as a method of selecting the closest focus detection result from among the focus detection results of the multiple point frames. Driving of the focus lens is controlled based on the focus detection result corresponding to the selected frame. On the other hand, if the camera control unit 131 has determined that a pupil is not detected in step S203, the focus detection is performed by using an image signal of an area corresponding to the face. In other cases, the focus detection is performed by using an image signal of an area corresponding to a pupil stored as the pupil selected in step S206 or designated in step S208.

In step S216, the display frame setting unit 151 sets the frame such as the face display frame or the pupil display frame based on a condition of the set frame display flag, and the image display unit 171 executes display based on this setting. Then, the processing proceeds to step S217.

In step S217, the camera control unit 131 clears all the frame display flags set based on the detection result in a current frame. Accordingly, a state of the display frame to be newly displayed in a subsequent frame is determined based on a detection result in the subsequent frame.

<Automatic Pupil Selection Processing>

Figure 3:
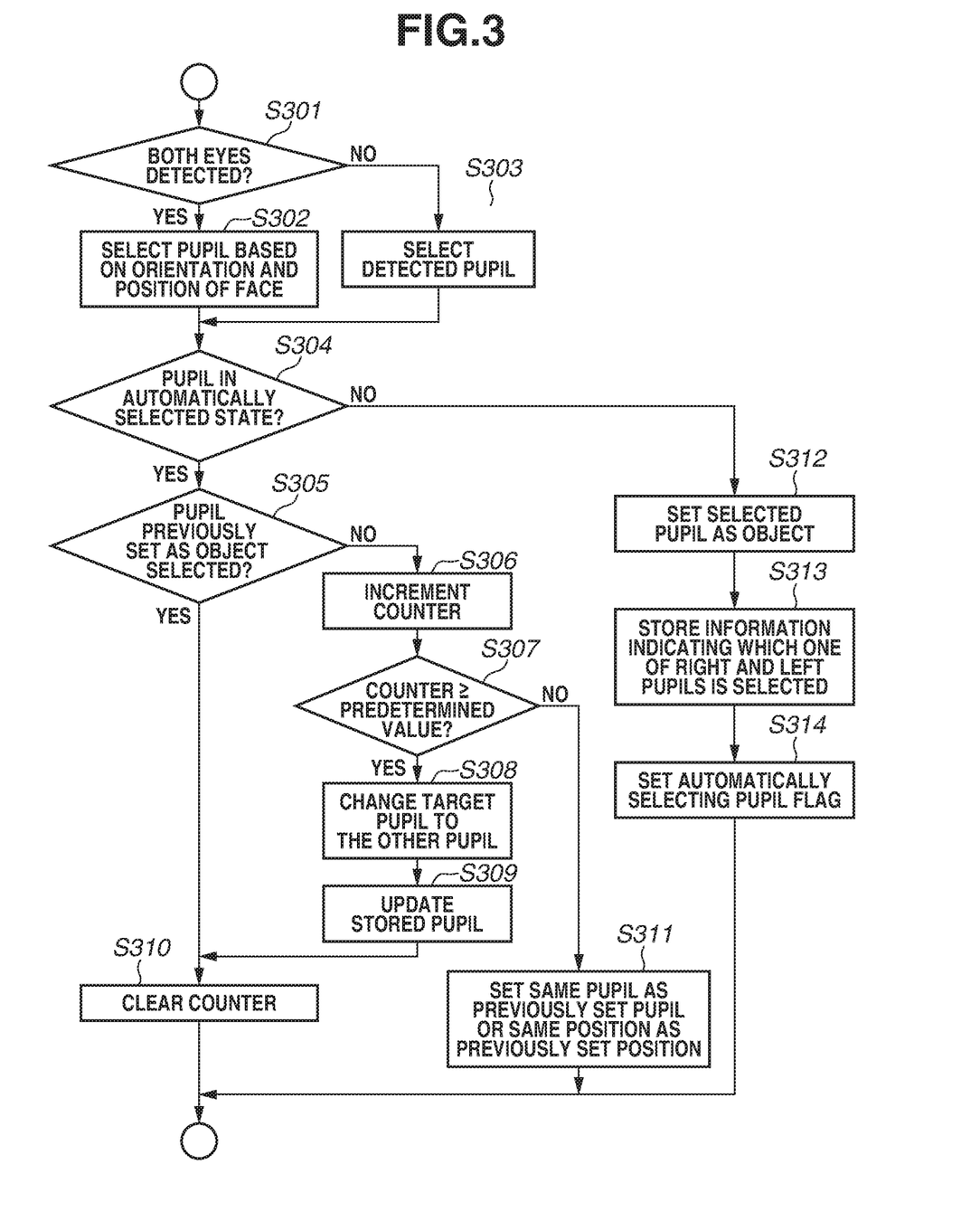
FIG. 3 is a flowchart illustrating a method for automatic pupil selection.

FIG. 3 is a flowchart illustrating the automatic pupil selection processing to be executed by the camera control unit 131 in step S206.

In step S301, the camera control unit 131 determines whether both eyes are detected by the organ information detection unit 142.

If both eyes are detected (YES in step S301), the operation proceeds to step S302. In step S302, the automatic pupil selection unit 150 selects either the right or left pupil based on an orientation and a position of the face detected by the face information detection unit 141. For example, in a case where the face faces forward, the pupil closer to the center of the angle of view is selected, and in a case where the face faces either leftward or rightward, the pupil closer to the camera is selected.

If only the pupil of one eye is detected (NO in step S301), the operation proceeds to step S303. In step S303, the automatic pupil selection unit 150 selects the detected pupil.

Next, in step S304, the camera control unit 131 determines whether the pupil is currently in an automatically selected state. If the pupil is not in the automatically selected state (NO in step S304), the operation proceeds to step S312. Processing in and after step S312 is performed in a case where the automatic pupil selection processing is executed for the first time.

In step S312, the camera control unit 131 sets the pupil selected in step S302 or step S303 as a target object.

In step S313, the camera control unit 131 stores information indicating which one of the right and left pupils is selected as the target object this time in the storage unit 153. Then, in step S314, the camera control unit 131 sets the automatically selecting pupil flag.

On the other hand, if the pupil of either of the eyes is already selected as the target object (YES in step S304), the operation proceeds to step S305. In step S305, the camera control unit 131 determines whether the pupil selected in step S302 or step S303 is the same pupil as a pupil previously set as the target object. If the selected pupil is not the same pupil as the pupil previously selected (NO in step S305), the operation proceeds to step S306. In and after step S306, the camera control unit 131 performs processing for determining whether to change the pupil set as the target object to the other pupil.

In step S306, the camera control unit 131 increments a counter.

In step S307, the camera control unit 131 determines whether the counter indicates a value greater than or equal to a predetermined value. If the counter indicates the value greater than or equal to the predetermined value (YES in step S307), the operation proceeds to step S308. In step S308, the camera control unit 131 causes the automatic pupil selection unit 150 to change the target pupil from the current pupil to the other pupil. Then, in step S309, the camera control unit 131 controls the storage unit 153 to store the new target pupil therein so that the stored pupil is updated. Then, in step S310, the camera control unit 131 clears the counter and prepares for the next pupil changing processing.

If the counter does not indicate the value that is greater than or equal to the predetermined value (NO in step S307), the operation proceeds to step S311. In step S311, the camera control unit 131 sets the same pupil as the previously set pupil as the target object. Alternatively, in a case where the same pupil as the previously set pupil is not detected, the camera control unit 131 sets the same position as the position of the pupil previously set as the target object as the target object, and suspends the pupil changing processing. This processing based on the counter is performed to prevent display from becoming unnatural due to successive changing of the selected pupil.

If the selected pupil is the same pupil as the previously selected pupil (YES in step S305), the operation proceeds to step S310. In step S310, the camera control unit 131 clears the counter.

As described above, in the automatic pupil selection processing, for example, in the case where the face faces forward, the pupil closer to the center in the angle of view is selected. In the case where the face faces either leftward or rightward instead of forward, the pupil closer to the camera is selected. Thus, the setting is made so as to enable easy focusing. Furthermore, in a situation where it is easier to bring the unselected pupil into focus, the operation for automatically changing the pupil to be selected is performed.

<Display Examples of Display Frame>

FIGS. 4A, 4B, 4C, 4D, and 4E each illustrate an example of the display frame illustrated in the flowchart in FIG. 2, and each illustrate an example of the face display frame and/or the pupil display frame displayed by the image display unit 171.

Figure 4A:
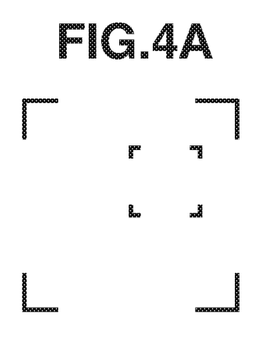
FIGS. 4A, 4B, 4C, 4D, and 4E each illustrate an example of transition of display of a face display frame or a pupil display frame according to the first exemplary embodiment.

FIG. 4A illustrates the example of the display frame at the time of the pupil automatic selection. This example is displayed in a case where the operation proceeds to step S202, step S203, step S204, step S205, step S206, step S207, and step S216.

Figure 4B:
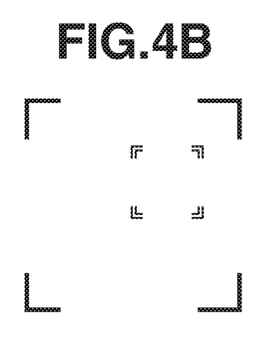

FIG. 4B illustrates the example of the display frame at the time of the pupil designation. In this example, the single face display frame and the double pupil display frame are displayed. This example is displayed in a case where the operation proceeds to step S205, step S208, step S209, step S211, and step S216, or to step S204, step S210, step S211, and step S216.

Figure 4C:
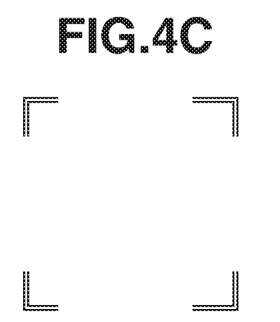

FIG. 4C illustrates the example of the display frame in a case where the operation proceeds to step S210, step S213, and step S216, or to step S203, step S212, step S213, and step S216. This example is displayed in a case where a pupil is designated but the designated pupil is not detected.

Figure 4D:
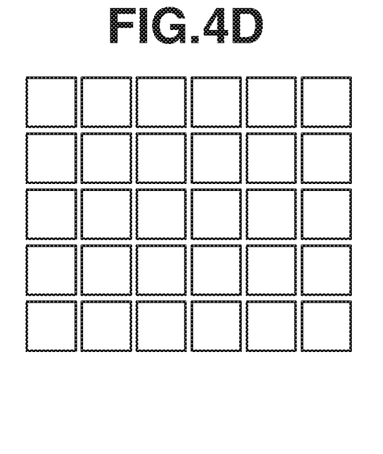
Figure 4E:
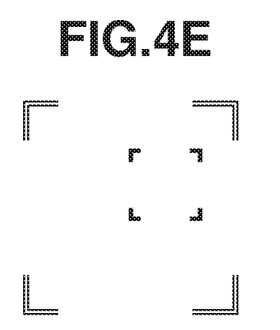

FIG. 4D illustrates the display example of the multiple point frames display in a case where the operation proceeds to step S214, step S215, and step S216, i.e., in a case where a face is not detected.

In the present exemplary embodiment, only the face display frame is displayed in a case where a pupil other than the designated pupil is detected, but the present exemplary embodiment is not limited to such a configuration. In a case where only the pupil other than the designated pupil is detected, the pupil other than the designated pupil may be provided with a display frame that clearly indicates that the pupil is being designated by the user. For example, the pupil display frame may be displayed as a single frame, and the face display frame may be displayed as a double frame (display example in FIG. 4E).

The present exemplary embodiment has been described by focusing on which one of the right and left pupils is selected as the object to be brought into focus. Although not illustrated, the focus detection unit 155 performs the focus detection processing based on an imaging signal corresponding to the selected pupil. Then, the camera control unit 131 transmits the focus-lens driving information (information about driving of the focus lens or information similar thereto) calculated based on the focus detection result obtained by the focus detection unit 155 to the lens control unit 111. Accordingly, an appropriate pupil can be brought into focus. A mode in which the camera control unit 131 controls driving of the focus lens group 104 to focus on the pupil designated by the user in the present exemplary embodiment corresponds to a first mode. A mode in which the camera control unit 131 controls driving of the focus lens group 104 to focus on the pupil selected by the automatic pupil selection processing corresponds to a second mode.

As described above, in a case where either the right or left pupil is selected, the designation state continues to be set while the detection of the face corresponding to the pupil is continued. This makes it possible to keep focusing on the pupil set by the user as a pupil desired for image capturing. In a case where the face becomes no longer detected, it is considered that a scene originally intended by the user has changed to a different scene. Thus, the designation of the pupil by the user is canceled, and an automatically selected pupil is brought into focus. This makes it possible to keep focusing on the pupil by flexibly dealing with a change of the scene. Furthermore, since the designated pupil can always be selected, the pupil desired by the user can always be brought into focus.

The present exemplary embodiment is described by using the example in which the pupil designation state is maintained while the detection of the face corresponding to the pupil is continued, and the pupil designation is canceled by the user if the face becomes no longer detected. However, here, a human body or a head may be used in place of the face. By using the human body or the head corresponding to the pupil, similar to the case of the face, it is possible to keep focusing on the intended pupil while the user can capture the intended object.

Next, a second exemplary embodiment of the present invention will be described. In the present exemplary embodiment, either the right or left pupil can be designated as an AF target object in a case where the object is face authenticated by the user. This makes it possible to focus on the same pupil in a case where the same person is captured again even if the user has temporarily lost track of the face or framing has greatly changed.

The description of the configuration and the processing of the present exemplary embodiment that are the same as those of the first exemplary embodiment will be omitted where possible, and a difference will be mainly described. The second exemplary embodiment is different in that the face information detection unit 141 has a known face authentication function. The face authentication function is a function of storing, in a memory (not illustrated), information (e.g., face feature point information, also referred to as authentication information) for identifying a face detected by the face information detection unit 141 and subjected to a designating operation by the user. This enables, for example, the authenticated face to be brought into focus preferentially. Here, in the present exemplary embodiment, information about which one of the left and right pupils is selected by the user (also referred to as designation information) is stored in association with the authentication information registered by the user. Accordingly, with respect to the face authenticated by the face authentication function, the same pupil can be always brought into focus.

Figure 5:
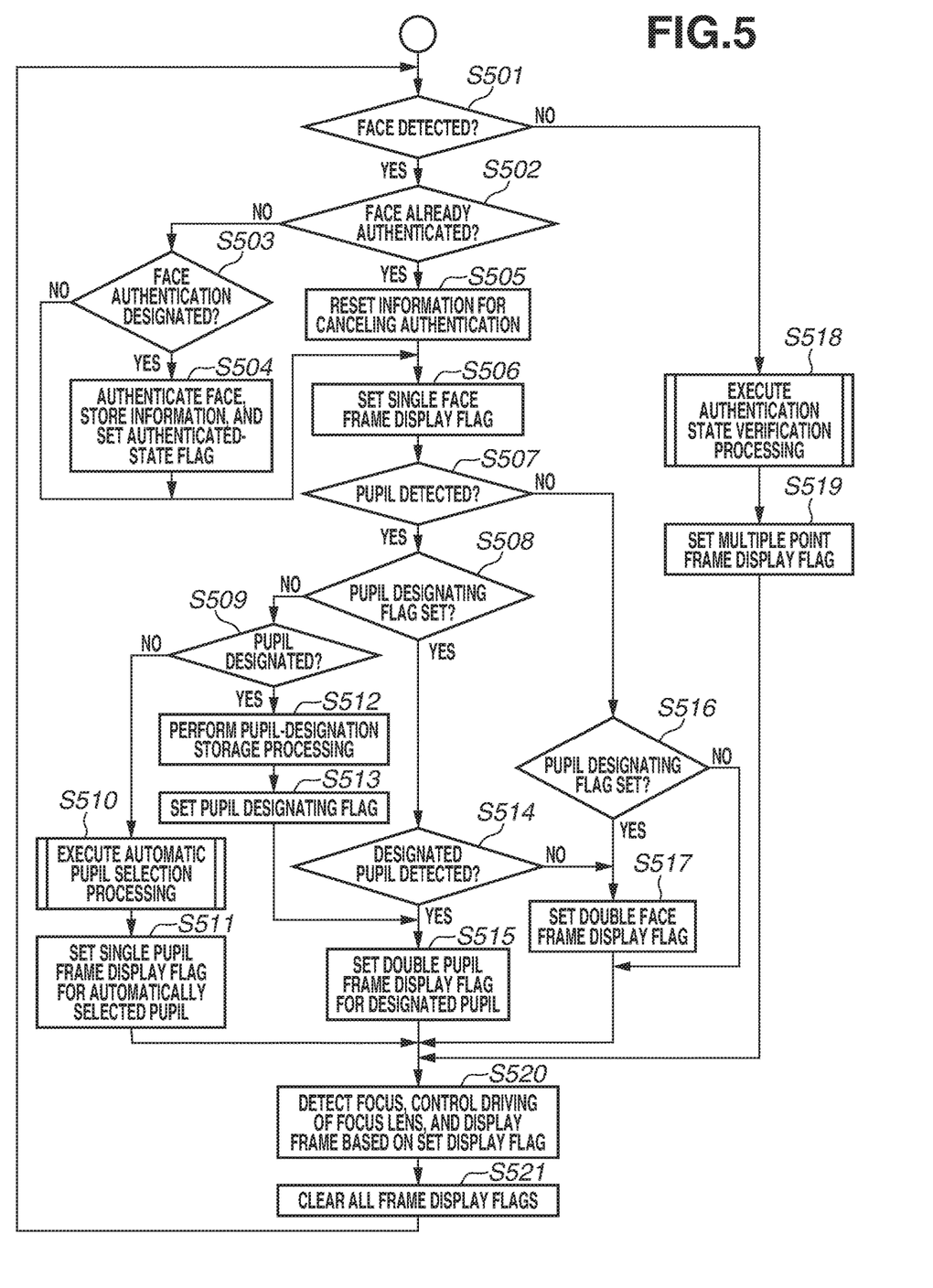
FIG. 5 is a flowchart illustrating operation according to a second exemplary embodiment of the present invention.

FIG. 5 illustrates a flowchart of operation in the camera control unit 131 according to the second exemplary embodiment. In FIG. 5, the description of an operation the same as that in FIG. 2 will be omitted where possible, and an operation different from FIG. 2 will be mainly described.

In step S501, the camera control unit 131 determines whether a face is detected by the face information detection unit 141.

If the face is detected (YES in step S501), the operation proceeds to step S502. In step S502, the camera control unit 131 determines whether the detected face is already authenticated by the face information detection unit 141.

If the detected face is not authenticated yet (NO in step S502), the operation proceeds to step S503. In step S503, the camera control unit 131 determines whether the face authentication has been designated for the currently detected face. The user designates such face authentication by, for example, operating the touch panel 172 in a case where the user desires to authenticate the currently detected face.

If the face authentication has been designated (YES in step S503), the operation proceeds to step S504. In step S504, the camera control unit 131 controls the face information detection unit 141 to authenticate the designated face. The camera control unit 131 also controls the storage unit 153 to store the authentication information of the face. Furthermore, the camera control unit 131 sets an authenticated-state flag.

If the detected face is already authenticated (YES in step S502), the operation proceeds to step S505. In step S505, the camera control unit 131 resets information for canceling the authentication. The information for canceling the authentication will be described in detail below.

Upon completion of a series of processes for authentication-related setting in steps S502 to S505, the operation proceeds to step S506. Here, a flow of steps S506 to S517 and a flow of steps S519 to S521 are similar to the flow of steps S202 to S213 and the flow of steps S215 to S217 in FIG. 2 of the first exemplary embodiment, respectively. Thus, the flows will not be described. However, when the designation information of the pupil is stored in a memory (not illustrated) in step S512, the camera control unit 131 performs control to store the designation information in association with the authentication information stored in step S504.

If the face is not detected (NO in step S501), the operation proceeds to step S518. In step S518, the camera control unit 131 performs control to execute authentication state verification processing.

<Authentication State Verification Processing>

Figure 6:
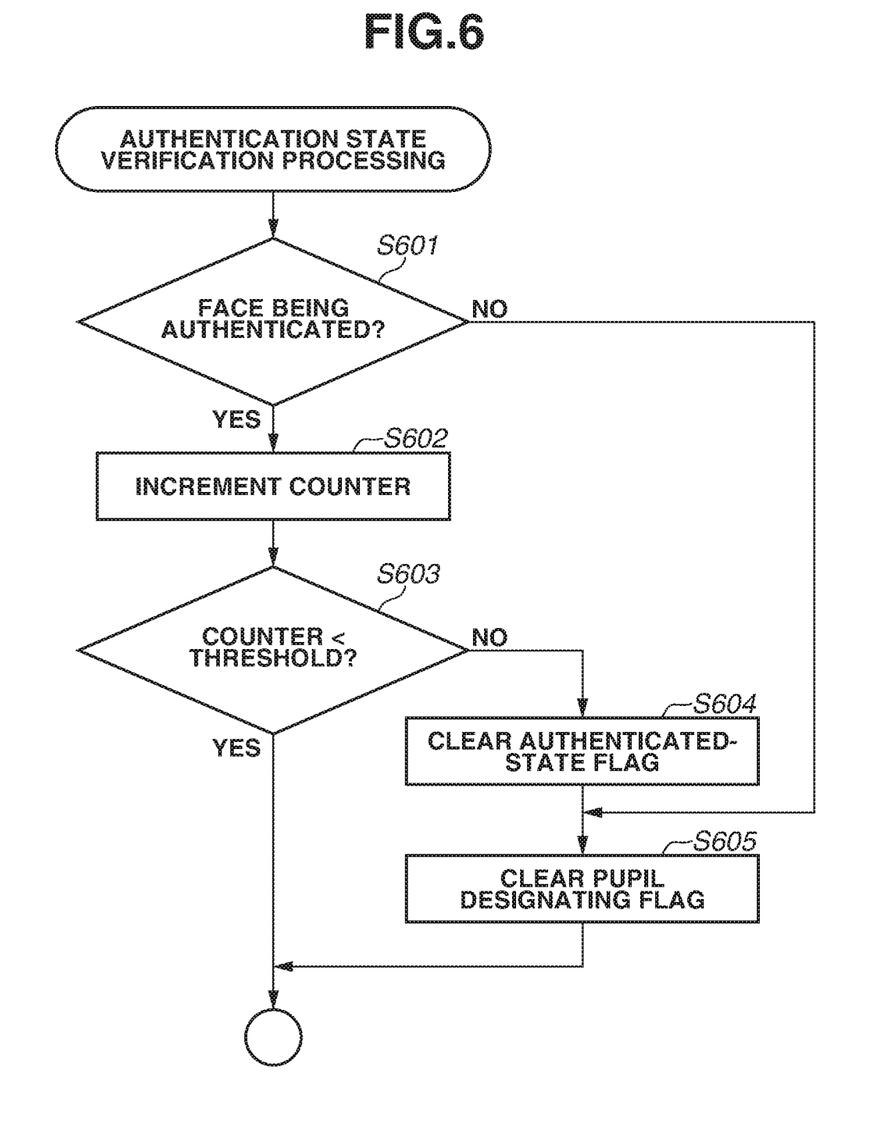
FIG. 6 is a flowchart about a face detection resuming method based on face authentication operation.

FIG. 6 is a diagram illustrating details of the authentication state verification processing in step S518. The processing in step S518 and the information for canceling the authentication will be described in detail with reference to FIG. 6.

In step S601, the camera control unit 131 determines whether the face is currently being authenticated. If the face is not currently being authenticated (NO in step S601), the operation proceeds to step S605. In step S605, the camera control unit 131 clears the pupil designating flag, as with the first exemplary embodiment. On the other hand, if the face is currently being authenticated (YES in step S601), the operation proceeds to step S602. In and after step S602, the camera control unit 131 performs control to determine whether to cancel the authentication. Here, as an example, setting is made to cancel the authentication in a case where a predetermined time has elapsed since the user has lost track of the face. In other words, the camera control unit 131 increments the counter in step S602 each time the face becomes no longer detected and the operation proceeds to the processing in FIG. 6 (step S518 in FIG. 5). Then, in step S603, the camera control unit 131 determines whether the value of the counter is less than a threshold. If the value of the counter is less than the threshold (YES in step S603), the processing of the flow ends. If the value of the counter is the threshold or more (NO in step S603), the operation proceeds to step S604. In step S604, the camera control unit 131 clears the authenticated-state flag. If the face is not detected again even after the predetermined time has elapsed, the authentication and the pupil designation are both canceled simultaneously by this processing. In this example, the above-described information for canceling the authentication is equivalent to the counter value. If the authenticated face is found again before the counter value reaches the threshold, the current state can be returned to an initial state by resetting the counter.

In a case where a long time has elapsed since the previous detection of the face, it is highly possible that the captured scene has greatly changed and the image-capturing target has changed. Thus, the authentication state can be automatically canceled by executing this processing.

It is also possible to always designate the same pupil every time the authenticated person is detected by enabling the user to set the threshold of the counter and by setting the threshold to infinity.

Furthermore, in the present exemplary embodiment, there is provided the configuration in which the face is authenticated based on the setting by the user. However, other configuration may also be used. For example, the detected face may be automatically authenticated, and the authentication result may be made valid later in a case where the pupil designation is performed. As described above, necessary detection operation can be performed by using the authentication function, without undermining the intention of the user.

The present invention has been described in detail above with reference to the two exemplary embodiments. However, the present invention is not limited to these specific exemplary embodiments, and includes various forms in a range not departing from the gist of the present invention. The above-described exemplary embodiments may also be partially combined as appropriate.

The present invention also includes a case where a program of software that implements the functions of the above-described exemplary embodiments is supplied to a system or apparatus that has a computer capable of executing the program. The program is supplied to the system or apparatus directly from a recording medium or by using wired/wireless communication. Therefore, the present invention is also implemented by a program code that is supplied to and installed on the computer to implement the functions and processing of the present invention using the computer. In other words, the computer program for implementing the functions and processing of the present invention is also included in the present invention. In this case, the program may be in any form such as an object code, a program to be executed by an interpreter, and script data to be supplied to an operating system as long as a function as the program is provided. Examples of the recording medium for supplying the program include a hard disk, a magnetic recording medium such as a magnetic tape, an optical/magneto-optical storage medium, and a nonvolatile semiconductor memory. A method for supplying the program may be such a method that a computer program that forms the present invention is stored in a server on a computer network, and a client computer connects to the server to download the computer program and executes the downloaded computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007011, filed Jan. 18, 2019, which is hereby incorporated by reference herein in its entirety.

What is claimed is:

1. An image capturing apparatus comprising at least one processor configured to perform operation of:
   a first detection unit configured to detect a first area based on an image signal output from an image sensor;
   a second detection unit configured to detect a second area corresponding to a first pupil included in a face, the second area being included in the first area;
   a designation unit configured to designate the second area detected by the second detection unit; and
   a control unit configured to control driving of a focus lens based on an image signal corresponding to the second area,
   wherein the designation unit cancels designation of the second area in a case where the first area becomes no longer detected by the first detection unit.

2. The imaging apparatus according to claim 1, wherein in a case where detection of the first area is continued by the first detection unit, the designation unit continues designation of the second area even in a case where the second area becomes no longer detected by the second detection unit.

3. The imaging apparatus according to claim 2, wherein in a case where the detection of the first area is continued by the first detection unit and where the second area is detected by the second detection unit after the second area becomes no longer detected by the second detection unit, the control unit controls driving of the focus lens based on an image signal corresponding to the second area.

4. The imaging apparatus according to claim 1, wherein in a case where detection of the first area is continued by the first detection unit and where the second area becomes no longer detected by the second detection unit, the control unit drives the focus lens based on an image signal corresponding to the first area.

5. The imaging apparatus according to claim 1, further comprising a selection unit configured to select either the second area detected from the first area by the second detection unit or a third area corresponding to a second pupil different from the first pupil,
   wherein the control unit has a first mode to drive the focus lens based on an image signal corresponding to the second area designated by the designation unit, and a second mode to control driving of the focus lens based on an image signal corresponding to the second area or the third area selected by the selection unit, and
   wherein the control unit shifts from the first mode to the second mode in a case where designation of the second area is canceled by the designation unit.

6. The imaging apparatus according to claim 1, further comprising a storage unit configured to store designation information of a user about a face registered by the user and a pupil included in the face, wherein even in a case where the first area becomes no longer detected by the first detection unit, the designation unit does not cancel designation of the first pupil in a case where the first area is the face registered by the user.

7. The imaging apparatus according to claim 1, wherein the first area is an area corresponding to a face.

8. The imaging apparatus according to claim 1, wherein the designation unit cancels designation of second area in a case where the first area is designated by a user by touch operation and the first area becomes no longer detected by the first detection unit for a predetermined time period.

9. The imaging apparatus according to claim 8, wherein the designation unit continues designation of the second area in a case where the first area is designated by the user by the touch operation and the first area becomes no longer detected by the first detection unit for a shorter time than the predetermined time.

10. The imaging apparatus according to claim 1, wherein the designation unit continues designation of the second area in a case where the first area is designated by the user by the touch operation and the first area becomes no longer detected by the first detection unit for a shorter time than the predetermined time.

11. A control method for an imaging apparatus, the control method comprising:
   detecting a first area based on an image signal output from an image sensor;
   detecting a second area corresponding to a first pupil included in a face, the second area being included in the first area;
   designating the detected second area; and
   controlling driving of a focus lens based on an image signal corresponding to the second area,
   wherein designation of the second area is canceled in a case where the first area becomes no longer detected.

* * * * *